US011913471B2

(12) United States Patent
Brisenheim

(10) Patent No.: US 11,913,471 B2
(45) Date of Patent: Feb. 27, 2024

(54) AIR GUIDE ARRANGEMENT FOR A VENTILATION SYSTEM

(71) Applicant: EBM-PAPST AB, Järfälla (SE)

(72) Inventor: Erik Brisenheim, Segeltorp (SE)

(73) Assignee: EBM-PAPST AB, Järfälla (SE)

( * ) Notice: Subject to any disclaimer, the term of this patent is extended or adjusted under 35 U.S.C. 154(b) by 0 days.

(21) Appl. No.: 17/285,702

(22) PCT Filed: Oct. 28, 2019

(86) PCT No.: PCT/EP2019/079379

§ 371 (c)(1),
(2) Date: Apr. 15, 2021

(87) PCT Pub. No.: WO2020/094443

PCT Pub. Date: May 14, 2020

(65) Prior Publication Data

US 2021/0340995 A1 Nov. 4, 2021

(30) Foreign Application Priority Data

Nov. 7, 2018 (DE) ..................... 10 2018 127 718.0

(51) Int. Cl.
*F04D 29/42* (2006.01)
*F04D 29/54* (2006.01)
*F04D 29/44* (2006.01)

(52) U.S. Cl.
CPC ....... *F04D 29/4253* (2013.01); *F04D 29/441* (2013.01); *F04D 29/545* (2013.01); *F05D 2250/52* (2013.01)

(58) Field of Classification Search
CPC .. F04D 29/4253; F04D 29/441; F04D 29/444; F04D 29/542; F04D 29/544; F04D 29/545; F05D 2250/52
See application file for complete search history.

(56) References Cited

U.S. PATENT DOCUMENTS 2,154,313 A * 4/1939 McMahan ............. F04D 29/541 415/181
3,329,415 A 7/1967 Cowan
3,412,929 A * 11/1968 Greenheck ............ F04D 25/082 415/126

(Continued)

FOREIGN PATENT DOCUMENTS

DE 3706772 A1 9/1988
EP 1898685 A1 3/2008

(Continued)

OTHER PUBLICATIONS

International Search Report and Written Opinion of the International Searching Authority, issued in PCT/EP2019/079379, dated Jan. 17, 2020; ISA/EP.

(Continued)

*Primary Examiner* — Courtney D Heinle
*Assistant Examiner* — Andrew J Marien
(74) *Attorney, Agent, or Firm* — Harness, Dickey & Pierce, P.L.C.

(57) ABSTRACT

An air guide arrangement, for a ventilation system, has a housing forming a flow channel with a fan arranged in the flow channel to generate an airflow through the housing. A flow guide device is arranged in the flow channels. The flow guide device is axially connected downstream of the fan on the outflow side and directly influences the airflow generated by the fan. The flow guide device has an axis-central through opening delimited by a tubular element extending parallel to the flow direction. Multiple separate flow segments are formed along the tubular element and are evenly distributed in the circumferential direction. The flow segments in the circumferential direction are each separated from one another in terms of flow by flow guide elements extending radially outward from the tubular element.

12 Claims, 2 Drawing Sheets

(56) References Cited

U.S. PATENT DOCUMENTS

| | | | | | |
|---|---|---|---|---|---|
| 4,548,548 | A * | 10/1985 | Gray, III | F04D 29/544 | 416/189 |
| 5,342,167 | A * | 8/1994 | Rosseau | F04D 29/544 | 415/220 |
| 5,466,120 | A * | 11/1995 | Takeuchi | F04D 29/703 | 415/119 |
| 5,951,245 | A * | 9/1999 | Sullivan | F04D 29/681 | 415/121.2 |
| 6,398,492 | B1 * | 6/2002 | Cho | F04D 29/544 | 416/189 |
| 6,997,678 | B2 * | 2/2006 | Sun | F04D 29/541 | 415/220 |
| 7,334,988 | B2 * | 2/2008 | Horng | F04D 29/544 | 415/211.2 |
| 8,057,161 | B2 * | 11/2011 | Seidler | F04D 29/703 | 415/26 |
| 8,157,513 | B2 * | 4/2012 | Takeshita | F04D 25/0613 | 415/121.1 |
| D703,310 | S * | 4/2014 | Masciarella | F04D 29/703 | D23/414 |
| 11,231,040 | B2 * | 1/2022 | Fetting | F04D 29/4253 | |
| 2005/0025620 | A1 * | 2/2005 | Horng | F04D 29/667 | 415/211.2 |
| 2005/0186070 | A1 * | 8/2005 | Zeng | F04D 29/544 | 415/211.2 |

FOREIGN PATENT DOCUMENTS

| | | | |
|---|---|---|---|
| EP | 2455617 | A2 | 5/2012 |
| EP | 3228873 | A1 | 10/2017 |
| EP | 3372838 | A1 | 9/2018 |
| KR | 20140037546 | A | 3/2014 |

OTHER PUBLICATIONS

Thomson Scientific, London, GB:, vol. 2014, No. 26 AN 2014-F86290 (Mar. 2014).

* cited by examiner

AIR GUIDE ARRANGEMENT FOR A VENTILATION SYSTEM

CROSS-REFERENCE TO RELATED APPLICATIONS

This application is a 371 U.S. National Phase of International Application No. PCT/EP2019/079379, filed Oct. 28, 2019, which claims priority to German Patent Application No. 10 2018 127 718.0, filed Nov. 7, 2018. The entire disclosures of the above applications are incorporated herein by reference.

FIELD

The disclosure relates to an air guide arrangement for a ventilation system, with a housing forming a flow channel, where a fan is arranged to generate an airflow through the flow channel of the housing.

Such air guide arrangements are known in the prior art in different designs. The simplest embodiments are metal plates, where the flow direction of an airflow is deflected.

Secondary guide devices also exist already, by which the expelled flow of fans can be influenced, as described, for example, in EP 3 228 873 A1.

The disclosure picks up this idea and develops it further in order to provide an air guide arrangement, by which, on the pressure side of the fan, the flow generated by the fan is changed from a turbulent flow domain in the direction of a laminar flow. At the same time, the dynamic pressure is changed into static pressure in order to minimize both the noise generation and the efficiency losses of the fan.

In radial fans, the post-treatment of the flow can occur by means of a spiral-shaped pressure space around the rotor. Here, the pressure space can be subdivided into multiple parts and comprise multiple outlets distributed over the circumference. However, this requires an increased installation space and is not suitable for air guide arrangements with a flow channel where the air conveyance occurs in an axial direction parallel to the direction of rotation of the fan.

SUMMARY

The aim is achieved by the combination of features according to an air guide arrangement designed for a ventilation system, with a housing forming a flow channel, where a fan is arranged to generate an airflow through the flow channel of the housing. In the flow channel of the housing, a flow guide device is arranged. It is axially connected downstream of the fan on the outflow side and directly influences the airflow generated by the fan. The air flow device has an axis-central through opening delimited by a tubular element extending parallel to the flow direction. Multiple separate flow segments are formed around the tubular element and evenly distributed in the circumferential direction and in the circumferential direction. The flow segments are each separated from one another in terms of flow by flow guide elements extending radially outward from the tubular element. According to the disclosure, an air guide arrangement for a ventilation system includes a housing forming a flow channel, in which a fan, in particular a radial or diagonal fan, is arranged to generate an airflow through the flow channel of the housing, a flow guide device is arranged. The flow guide is axially connected downstream of the fan on the outflow side and that directly influences the airflow generated by the fan. For this purpose, the flow guide device has an axis-central through opening delimited by a tubular element extending parallel to the flow direction, around which multiple separate flow segments are formed, and evenly distributed in the circumferential direction. In the circumferential direction, the flow segments are each separated from one another in terms of flow by flow guide elements extending radially outward from the tubular element.

An underlying idea of the disclosure includes influencing the airflow generated by the fan via the flow guide device connected downstream so that the existing turbulence swirl of the flow is reduced. Thus, the noise level is lowered and the efficiency is increased. Via the flow guide device, the pressure-side turbulent flow generated by the fan is shifted in the direction of laminar flow, and the dynamic pressure is changed into static pressure. In the flow guide device, via the tubular element, on the one hand, a through opening about the rotation axis of the fan wheel of the fan is generated. On the other hand, the separate flow segments radially adjoin the tubular element on the outside and influence the flow near the inner wall of the flow channel via the flow guide elements.

In an advantageous embodiment variant, the flow guide device includes an outer wall closed in a circumferential direction, which radially encloses and confines the flow segments in the manner of an outer jacketing on the outside. The flow segments are thus determined on the inner side by the tubular element and on the outer side by the outer wall. Through each flow segment, at least one flow guide element extends and acts on the flow generated by the fan.

In the air guide arrangement, the flow guide elements are designed as a kind of baffle. When viewed in a radial cross section, they have a straight, a bent or a partially straight and partially bent course. Here, a special embodiment example provides that, when viewed in the radial direction, the flow guide elements are designed as straight on a first marginal section and bent on a second marginal section. The transition between these individual sections is preferably continuous.

Furthermore, an advantageous embodiment is one where, when viewed in the radial section, the flow guide elements have in each case an airfoil shape. They have a concavely bent course, and the flow is guided around the concavely bent portion of the flow guide elements.

The flow guide device of the air guide arrangement can be adapted to different cross sections of the flow channel. It includes an effective throughflow cross-sectional area of the individual flow segments that varies. The effective throughflow cross-sectional area is determined by the axial cross-sectional area with free throughflow in the flow channel. For example, in a square or rectangular flow cross section of the flow channel, the flow segments can have an enlarged throughflow cross-sectional area in the corners. This can be adjusted via the form of the tubular element and of the outer wall.

Furthermore, an advantageous embodiment of the air guide arrangement is one where the flow guide elements extend uninterrupted from the tubular element radially outward toward the outer wall and in axial flow direction completely through the flow guide device. Consequently, no additional noise arises within the individual flow guide elements.

When viewed in the axial cross section, the tubular element preferably has a cylindrical, square or octagonal cross section. Thus, the form of the individual flow segments can be varied as needed.

When viewed as a whole, the flow guide device is preferably designed as a cuboid that can be incorporated as component in the housing. In addition, the flow guide device is preferably in the form of a single part.

The air guide arrangement is furthermore characterized in an embodiment example in that a sum of the effective throughflow cross-sectional area of all the flow segments determines 50-90% of a total throughflow cross-sectional area of the flow channel.

In a development, it is provided that, in the air guide arrangement, between the flow guide device and an inner wall of the flow channel facing the flow guide device, a spacing is provided. The flow can thus flow in the flow channel to a certain extent outside past the flow guide device. The spacing is preferably established in such a manner that it corresponds to up to 50% of a radial height of the flow segments. To the extent that the cross sections are square or rectangular, the term "radial" likewise relates to the direction perpendicular to the axial flow direction within the flow channel, i.e., from the axial center of the flow channel outward in the direction of the housing.

The flow guide elements are also defined with regard to their geometric length. Preferably, their axial extent is in a range of 15-150% of a maximum axial cross section of the flow channel.

In a development, the air guide arrangement provides that, in the flow channel, a guide device enclosing the fan is provided. The guide device extends from an axial inlet of the flow channel to an inner wall delimiting the flow channel. Thus, the effective throughflow cross section of the flow channel is increased in the flow direction. The air guide device influences the flow already in the region of the fan and cooperates with the flow guide device connected downstream on the pressure side, in order to achieve the aim even better. Here, advantageous designs of the guide device, when viewed in the radial cross section, have a round, angled or multiply angled cross section. The guide device increases to a maximum the effective throughflow cross-sectional area in the flow channel still in the region of the fan, i.e., up to the inner wall of the flow channel.

DRAWINGS

The drawings described herein are for illustrative purposes only of selected embodiments and not all possible implementations, and are not intended to limit the scope of the present disclosure.

Other advantageous developments of the disclosure are characterized in the dependent claims and represented in further detail below together with the description of the preferred embodiment of the disclosure in reference to the figures. The figures show:

DETAILED DESCRIPTION

Figure 1:
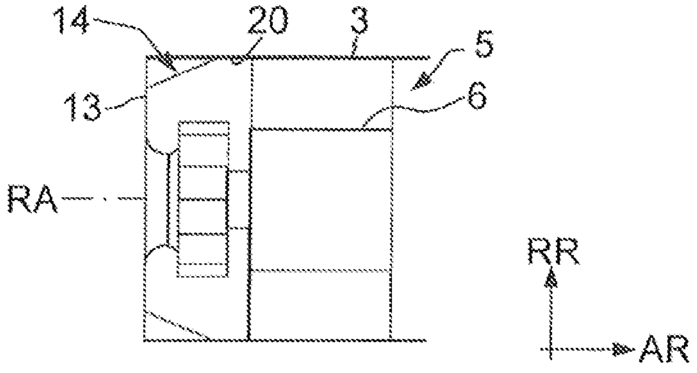
FIG. 1 is a cross-sectional view through an air guide arrangement in a first embodiment.

Below, the disclosure is further explained in reference to FIGS. 1 to 10 with the aid of the description of the different embodiments, wherein identical reference numerals refer to structurally and/or functionally identical components.

In FIGS. 1 and 5-7, embodiment variants of the air guide arrangement 1 are represented in the radial section. Referring first to FIG. 1, the air guide arrangement 1 includes a housing 3 that forms the flow channel 2. A fan 4 is arranged to generate the airflow through the flow channel 2 of the housing 3. The fan 4 is designed as a radial fan, axial fan or diagonal fan and generates a flow from the inlet 13, in axial direction AR, through the flow channel 2. For this purpose, the fan 4 includes a fan wheel rotating about the rotation axis RA, by means of which air is axially suctioned and axially, diagonally or radially expelled. In a radial fan, a deflection of the flow from the radial direction RR into the axial direction AR occurs.

Figure 5:
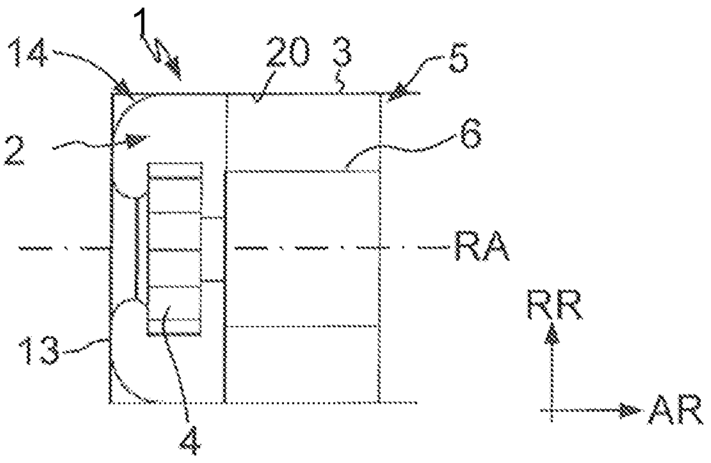
FIG. 5 is a cross-sectional view through an air guide arrangement in the second embodiment.

When viewed in the axial direction AR, downstream of the fan 4 on the outflow side in the flow channel 2, the flow guide device 5 is arranged. It directly influences the air flow generated by the fan 4 in order to reduce the turbulence swirl of the flow. Preferably, the flow guide device 5 is arranged in the axial direction AR directly adjacent to the fan 4. In FIG. 5, the flow guide device 5 extends up to an inner wall 20 of the flow channel 2 formed by the housing 3.

Figure 2:
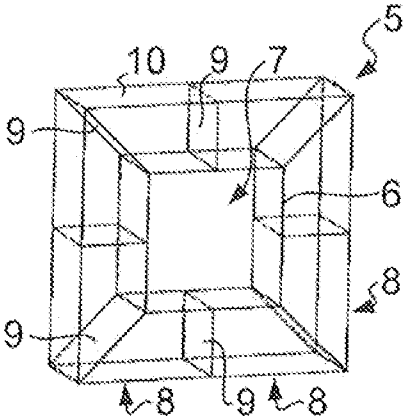
FIG. 2 is a perspective view of a flow guide device in a first embodiment.
Figure 3:
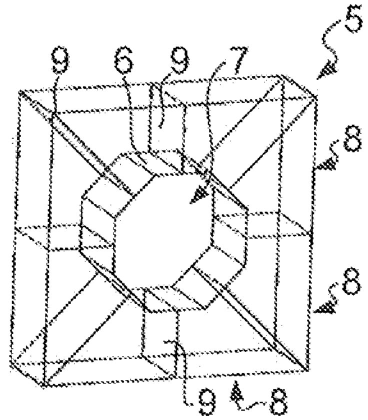
FIG. 3 is a perspective view of a flow guide device in the second embodiment.
Figure 4:
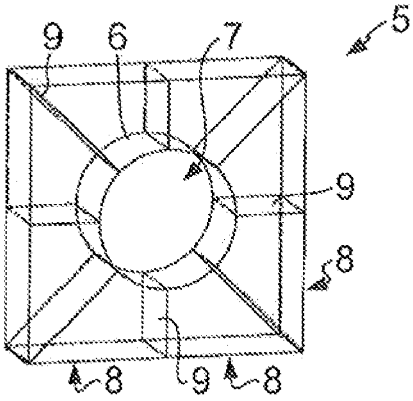
FIG. 4 is a perspective view of a flow guide device in the third embodiment.

Embodiment examples of the flow guide device 5 are represented in FIGS. 2-4.

According to the embodiment in FIG. 2, the flow guide device 5 is formed by an element 6 that is square when viewed in the axial direction. It is enclosed by an outer wall 10 that is square when viewed in the axial direction. Between the tubular element 6 and the outer wall 10, eight flow guide elements 9 extend evenly distributed in a circumferential direction. The flow guide elements delimit eight flow segments 8 with axial throughflow around an axis-central through opening 7 generated by the tubular element 6. The flow generated by the fan 4 is influenced by each of the elements, tubular element 6, outer wall 10 and in particular flow the guide elements 9.

The embodiment according to FIG. 3 differs from the embodiment example according to FIG. 2 by an octagonal axial cross section of the tubular element 6 and the resulting slightly different connection with the flow guide elements 9, exclusively on surface sections of the tubular element 6. The embodiment according to FIG. 4 differs from the embodiment examples according to FIGS. 2 and 3 by a round cross section of the tubular element 6 but for the rest it is the same. All the flow guide devices 5 according to FIGS. 2-4, when viewed as a whole, are cuboid and fit in the correspondingly formed flow channel 2.

Figure 6:
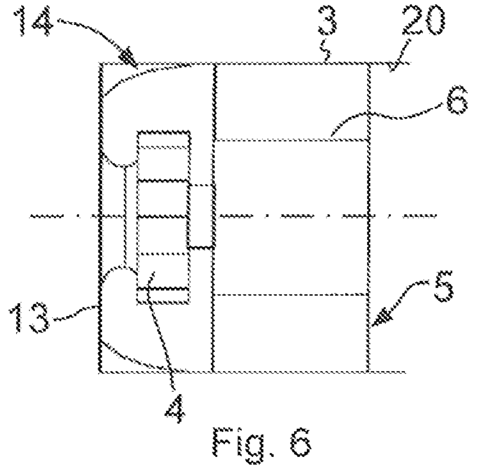
FIG. 6 is a cross-sectional view through an air guide arrangement in the third embodiment.

Returning to FIG. 1, a first embodiment of the guide device 14 is also shown positioned in the flow channel 2 around the fan 4. The guide device 14, generated preferably via metal plates, extends with a round cross section from the axial inlet 13 of the flow channel 2 to the inner wall 20 delimiting the flow channel 2. In this manner, it increases the effective throughflow cross section of the flow channel 2 in the flow direction toward the flow guide device 5. FIGS. 6 and 7 in this regard show additional embodiment variants with a multiply angled or straight cross section of the guide device 14.

In all the embodiments according to FIGS. 1 and 5-7, the sum of the effective throughflow cross-sectional area of all the flow segments 8 determines approximately 60% of the total throughflow cross-sectional area of the flow channel 2. Thus, to axial extent of the flow guide device 5 and therefore of the flow guide elements 9 is approximately 50% of the axial cross section of the flow channel 2.

Figure 7:
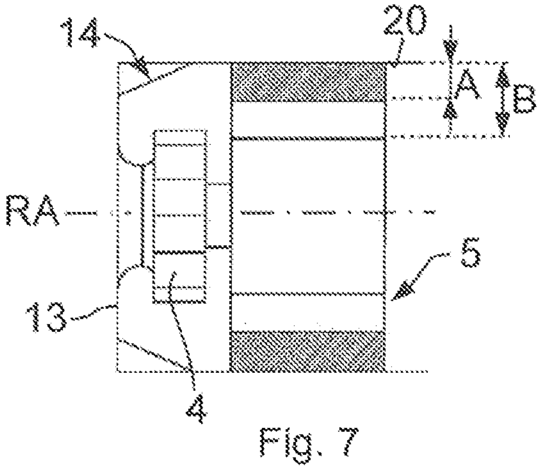
FIG. 7 is a cross-sectional view through an air guide arrangement in the fourth embodiment.

In FIG. 7, a variant of a flow guide device 5 is represented, where its radial extent is smaller than the throughflow cross-sectional area of the flow channel 2. Thus, the outer wall 10 of the flow guide device 5 is spaced from the inner wall 20 of the flow channel 2 by a spacing A. The flow can thus flow radially on the outside past the flow guide device 5 and around the outer wall 10. The spacing A is approximately 50% of the radial height B beginning at the flow segments 8 to the inner wall 20 of the flow channel 2.

Figure 8:
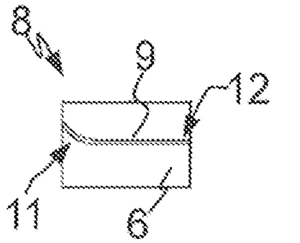
FIG. 8 is a diagrammatic view of a flow segment of a flow guide device in the first embodiment.
Figure 9:
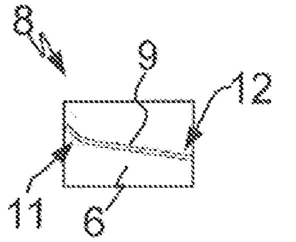
FIG. 9 is a diagrammatic view of a flow segment of a flow guide device in the second embodiment.
Figure 10:
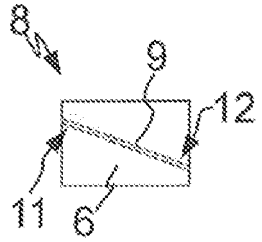
FIG. 10 is a diagrammatic view of a flow segment of a flow guide device in the third embodiment.

The flow guide elements 9 in FIGS. 2-4 are each represented as straight. However, in these embodiment variants, the alternative solutions according to FIGS. 8-10 can be integrated, where the flow guide elements 9 include two marginal sections 11, 12. According to FIG. 8, when viewed in radial cross section, they are bent on a marginal section 11 and straight on the other marginal section 12. In FIGS. 8-10, the inflow side is on the left side, and the outflow side of the flow guide device 5 is on the right side. According to FIG. 9, the flow guide elements 9 are formed identically to the embodiment according to FIG. 8, but they are arranged with an inclination. FIG. 10 shows a variant with flow guide element 9 arranged with an inclination but running in a straight line on both marginal sections 11, 12. The corresponding embodiments can be integrated in all the flow segments 8 of the embodiments according to FIGS. 2-4, even if this is not specifically represented. In addition to the continuous courses of the flow guide elements 9, embodiments with angled or multiply angled flow guide elements 9 can also be additionally implemented. It is also not shown but nonetheless part of the disclosure to design the flow guide elements 9 concavely curved in the shape of an airfoil. The flow elements 9 stand in the flow and influence the flow in the direction of a laminar flow and static pressure.

Figure 11A:
FIG. 11 is a side elevation view of a selection of useable cross-sectional forms of the flow guide elements.
Figure 11B:
Figure 11C:
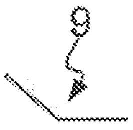
Figure 11D:
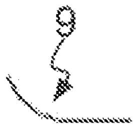

A selection of the cross-sectional forms of the flow guide elements 9, that can be used according to the disclosure, is diagrammatically shown in FIGS. 11*a*-11*c*. FIG. 11*a* represents a defined rounding. FIG. 11*b* represents a rounding with a straight line adjoining it in flow direction. FIG. 11*c* represents a bent form. FIG. 11*d* represents a multiply angled form with a straight line adjoining it in flow direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air guide arrangement for a ventilation system, comprising:

a housing forming a flow channel and a fan arranged for generating an airflow through the flow channel of the housing;

a flow guide device is arranged in the flow channel of the housing, the flow guide device is separate and distinct from the housing, the flow guide device, when viewed as a whole, is cuboid and is axially positioned downstream of the fan on an outflow side and which directly influences the airflow generated by the fan, the flow guide device includes a tubular element, flow segments and an outer wall, the tubular element has an axis-central through opening delimited by the tubular element extending parallel to the flow direction, the multiple separate flow segments are formed around the tubular element;

the flow segments are evenly distributed in the circumferential direction, the flow segments are each separated from one another in terms of flow by flow guide elements, the flow guide elements extend radially outward from the tubular element to the flow guide outer wall and the flow guide element extends uninterrupted from the tubular element radially toward the outer wall and in the axial flow direction completely through the flow guide device and wherein, viewed in a radial direction, the flow guide elements are bent on a first marginal section at an inflow side edge and straight on a second marginal section at an outflow side edge and a continuous transition is between the first and second sections; and an effective throughflow cross-sectional area of the individual flow segments varies in an axial direction.

2. The air guide arrangement according to claim 1, wherein the flow guide device outer wall radially encloses the flow segments on an outside and delimits them spatially.

3. The air guide arrangement according to claim 1, wherein, viewed in a radial cross section, the flow guide elements have a straight, a bent or a partially straight and partially bent course.

4. The air guide arrangement according to claim 2, wherein the flow guide elements extend uninterrupted from the tubular element radially outward toward the outer wall and in axial flow direction completely through the flow guide device.

5. The air guide arrangement according to claim 1, wherein, viewed in an axial cross section, the tubular element has a cylindrical, square or octagonal cross section.

6. The air guide arrangement according to claim 1, wherein, viewed in a radial section, the flow guide elements each have an airfoil shape.

7. The air guide arrangement according to claim 1, wherein a sum of the effective throughflow cross section area of all the flow segments determines 50-90% of a total throughflow cross-sectional area of the flow channel in the axial direction.

8. The air guide arrangement according to claim 1, wherein between the flow guide device and an inner wall of the flow channel facing the flow guide device, a spacing is provided.

9. The air guide arrangement according to claim 8, wherein the spacing corresponds to up to 50% of a radial height beginning at the flow segments to an inner wall of the flow segments of the flow channel.

10. The air guide arrangement according to claim 1, wherein an axial extent of the flow guide elements is in a range of 15-150% of an axial cross section of the flow channel.

11. The air guide arrangement according to claim 1 wherein, a guide device enclosing the fan is provided in the flow channel, the guide device extending from an axial inlet of the flow channel to an inner wall delimiting the flow channel.

12. The air guide arrangement according to claim 11, wherein the guide device, viewed in the radial cross section, has a round, or angled or multiply angled cross section.

* * * * *